(12) United States Patent
Sheoran et al.

(10) Patent No.: US 7,698,896 B2
(45) Date of Patent: Apr. 20, 2010

(54) COMPACT, LIGHT WEIGHT EDUCTOR OIL COOLER PLENUM AND SURGE FLOW PLENUM DESIGN

(75) Inventors: Yogendra Y. Sheoran, Scottsdale, AZ (US); Cristopher Frost, Scottsdale, AZ (US)

(73) Assignee: Honeywell International Inc., Morristown, NJ (US)

( * ) Notice: Subject to any disclaimer, the term of this patent is extended or adjusted under 35 U.S.C. 154(b) by 704 days.

(21) Appl. No.: 11/303,180

(22) Filed: Dec. 15, 2005

(65) Prior Publication Data

US 2007/0022731 A1 Feb. 1, 2007

Related U.S. Application Data

(60) Provisional application No. 60/703,487, filed on Jul. 27, 2005.

(51) Int. Cl.
*F02K 1/00* (2006.01)
(52) U.S. Cl. ............................. 60/770; 60/771
(58) Field of Classification Search .............. 60/249, 60/770, 771
See application file for complete search history.

(56) References Cited

U.S. PATENT DOCUMENTS

| | | | |
|---|---|---|---|
| 3,137,131 A * | 6/1964 | Tyler et al. | 239/265.11 |
| 3,472,029 A | 10/1969 | Colley | |
| 3,489,377 A | 1/1970 | Pearson et al. | |
| 4,713,933 A | 12/1987 | Bandera | |
| 4,932,206 A | 6/1990 | Sawyer et al. | |
| 5,265,408 A | 11/1993 | Sheoran et al. | |
| 5,284,012 A | 2/1994 | Laborie et al. | |
| 5,655,359 A | 8/1997 | Campbell et al. | |
| 6,092,360 A | 7/2000 | Hoag et al. | |
| 6,272,838 B1 | 8/2001 | Harvell et al. | |
| 6,520,738 B2 | 2/2003 | Sheoran et al. | |
| 6,578,351 B1 | 6/2003 | Modafferi | |
| 6,615,576 B2 | 9/2003 | Sheoran et al. | |
| 6,651,929 B2 | 11/2003 | Dionne | |
| 2002/0139120 A1 | 10/2002 | Sheoran et al. | |
| 2005/0268593 A1 | 12/2005 | Hagshenas et al. | |

FOREIGN PATENT DOCUMENTS

| | | |
|---|---|---|
| EP | 06117760 | 12/2006 |
| WO | WO 93/16280 | 8/1993 |
| WO | WO 03/037715 A1 | 5/2003 |

* cited by examiner

*Primary Examiner*—Michael Cuff
*Assistant Examiner*—Andrew Nguyen
(74) *Attorney, Agent, or Firm*—Ingrassia Fisher & Lorenz, P.C.

(57) ABSTRACT

An eductor assembly is provided that includes a primary nozzle, a cooler plenum, and a surge plenum. In one embodiment, and by way of example only, the primary nozzle is configured to accelerate and discharge turbine exhaust gas therefrom and the cooler plenum surrounds the primary nozzle and includes at least a fluid inlet and a fluid outlet. The surge plenum partially surrounds the primary nozzle and the cooler plenum and includes at least a fluid inlet and a fluid outlet. The surge plenum fluid outlet axially aligns and is coterminous with the cooler plenum fluid outlet.

10 Claims, 5 Drawing Sheets

COMPACT, LIGHT WEIGHT EDUCTOR OIL COOLER PLENUM AND SURGE FLOW PLENUM DESIGN

CROSS-REFERENCES TO RELATED APPLICATIONS

This application claims the benefit of U.S. Provisional Application No. 60/703,487, filed Jul. 27, 2005.

TECHNICAL FIELD

The present invention relates to an exhaust system of a gas turbine engine and, more particularly, to an eductor oil cooler and surge flow plenum assembly for use in the exhaust system.

BACKGROUND

Auxiliary power units ("APU"s) are gas turbine engines that are used in aircraft to provide electrical and pneumatic power for various equipment therein. Typically, APUs are located in the aft section of the aircraft, such as in the tail cone, and are isolated from other sections of the aircraft by a firewall. During operation, APUs may produce exhaust gas. In some aircraft, the exhaust gas is directed through a nozzle and an exhaust duct, and out the aircraft through an exhaust opening. In some aircraft configurations, the APU nozzle may communicate with an eductor system that uses the APU exhaust gas to draw and direct other gases through the aircraft.

Many eductor systems include a dual plenum configuration. For example, in some systems, a first plenum is used to draw gas across an oil cooler (referred to herein as the "oil cooler plenum"), while a second plenum is used to direct surge flow gas to the exhaust duct. The two plena are typically tandemly arranged. In one conventional configuration, the APU nozzle is surrounded by the two tandemly arranged plena, and the oil cooler plenum is placed in a location forward of the surge flow plenum. In another conventional configuration, the oil cooler plenum is placed aft of the surge flow plenum. In still another conventional configuration, the oil cooler plenum circumscribes the APU nozzle and the surge flow plenum is disposed downstream of the oil cooler plenum and APU nozzle.

Although tandemly-arranged eductor systems, such as those described above, are useful, they do suffer from certain drawbacks. For example, these tandem plena may not fit within converging aircraft tail cones, or "blade tails", which have recently been incorporated into new aircraft designs to lower operating costs and increase aircraft fuel economy. Specifically, tandem plena may be too long and bulky, to be placed in these blade tails and may interfere with the walls of the blade tail. To better accommodate the plena, some designs move the APU forward to place the plena in a wider portion of the tail cone. However, these configurations may not be desirable because the distance between the forward fire wall and the APU may not be sufficient to allow removal of various line replacement units ("LRUs") during repair and overhaul of other tailcone components.

Hence, there is a need for an oil cooler and surge flow plenum system that may be disposed in a blade tail. Additionally, it is desirable for the system to be lightweight and relatively compact. Moreover, there is a need for a system that, when installed, provides a sufficient distance between the forward firewall of the tailcone and the APU to allow removal of LRUs during repair and overhaul of other tailcone components.

BRIEF SUMMARY

The present invention provides an eductor assembly that includes a primary nozzle, a cooler plenum, and a surge plenum.

In one embodiment, and by way of example only, the primary nozzle is configured to accelerate and discharge turbine exhaust gas therefrom and the cooler plenum surrounds the primary nozzle and includes at least a fluid inlet and a fluid outlet. The surge plenum partially surrounds the primary nozzle and the cooler plenum and includes at least a fluid inlet and a fluid outlet. The surge plenum fluid outlet axially aligns and is coterminous with the cooler plenum fluid outlet.

In another embodiment, and by way of example only, the primary nozzle is configured to accelerate and discharge turbine exhaust gas therefrom, has a circumference, and is disposed about a longitudinal axis. The cooler plenum surrounds the primary nozzle and is configured to allow gas to flow around the primary nozzle circumference at a substantially constant flow velocity. The surge plenum partially surrounds the primary nozzle and the cooler plenum and includes at least a fluid inlet and a fluid outlet. The surge plenum fluid outlet is axially aligned and coterminous with the cooler plenum fluid outlet.

In still another embodiment, by way of example only, the cooler plenum surrounds the primary nozzle and includes a first, a second, and a third axial cross-sectional area each disposed at different angular locations relative to the longitudinal axis, the second axial cross-sectional area disposed between and greater than each of the first and third axial cross-sectional areas.

Other independent features and advantages of the preferred assembly will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention.

Figure 1:
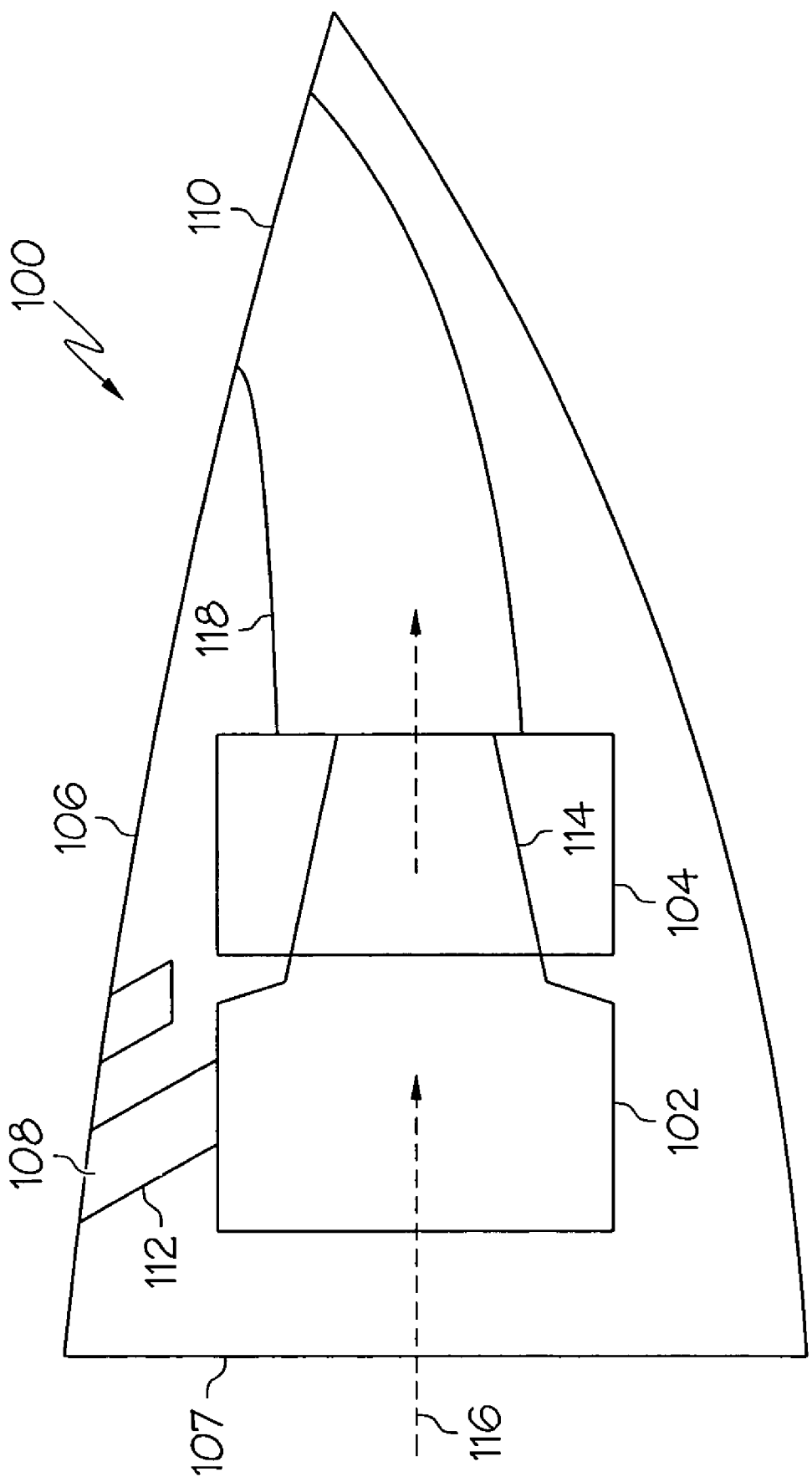
FIG. 1 is a schematic of an aircraft tailcone.

Turning now to the description, FIG. 1 illustrates an aircraft tailcone 100 within which an auxiliary power unit ("APU") 102 and an exemplary eductor oil cooler and surge flow plenum assembly 104 are disposed. The tailcone 100 is generally conical and has a tubular sidewall 106 enclosed at one end by a firewall 107. The sidewall 106 has inlet and exhaust openings 108, 110 that are formed therein. The APU 102 may be used to drive a number of non-illustrated devices, including, for example, a gearbox, a generator, or a load compressor and receives gas from an inlet duct 112 that extends between the APU 102 and the inlet 108. The gas is accelerated through the APU 102 and exhausted through a nozzle 114 that is coupled thereto. The nozzle 114 is disposed about a longitudinal axis 116 and directs the high velocity exhaust gas into an exhaust duct 118. Although the nozzle 114 shown in FIG. 1 is generally frustoconically shaped, it will be appreciated that the nozzle 114 may have any one of numerous other suitable configurations that cause the exhaust gas to flow therethrough in a desirable manner. For example, the nozzle 114 may be a lobed mixer nozzle, which may be used to reduce swirl in the APU exhaust gas and improve eduction performance of the eductor oil cooler and surge flow plenum assembly 104. After the gas is exhausted from the APU 102, it is directed through the exhaust duct 118 and exits the aircraft via the exhaust opening 110.

Figure 2:
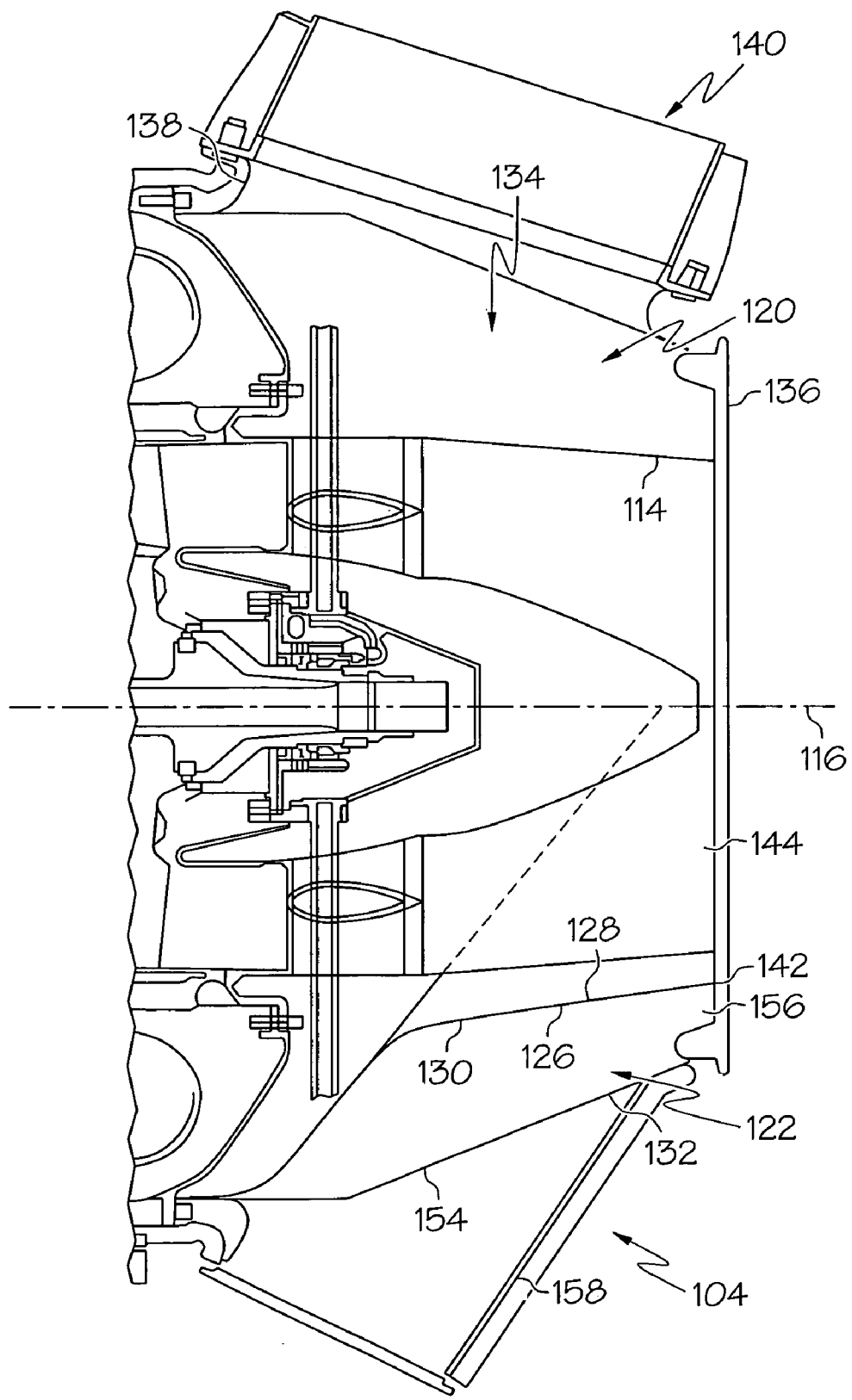
FIG. 2 is a cross section view of an exemplary eductor oil cooler and surge flow plenum assembly that may be incorporated into the tailcone depicted in FIG. 1.

The eductor oil cooler and surge flow plenum assembly 104 is configured to employ the flow of high velocity exhaust gas to draw other gas through the aircraft. As shown in FIG. 2, the assembly 104 includes an oil cooler plenum 120 and a surge flow plenum 122 that are disposed at substantially the same axial location along the longitudinal axis 116 and are circumferentially staggered around the nozzle 114. The oil cooler plenum 120 and surge flow plenum 122 are separated from each other and are each defined, in part, by a wall 126. More particularly, the wall 126 has an inner surface 128 that, together with the nozzle 114, forms the oil cooler plenum 120 and an outer surface 130 that, together with an outer wall 132, forms the surge flow plenum 122.

The oil cooler plenum 120 includes a fluid inlet 134 and a fluid outlet 136. The fluid inlet 134 communicates with an oil cooler duct 138 within which an oil cooler 140 is disposed. Preferably, the oil cooler plenum 120 surrounds an entire circumference of the nozzle 114 to maximize contact between high velocity APU exhaust gas that flows through the nozzle 114 and the gas that is pulled through the oil cooler plenum 120 to thereby increase pumping of gas through the fluid inlet 134. To further increase pumping of gas through the fluid inlet 134, the fluid outlet 136 is aligned with an end 144 of the nozzle 114. Thus, gas flowing through the fluid outlet 136 will be entrained by the high velocity APU exhaust gas and both will flow together through the exhaust duct 118 (shown in FIG. 1).

It will be appreciated that the volume of space needed to accommodate the cooled gas decreases as distance from the fluid inlet 134 increases, and that the gas in the oil cooler plenum 120 preferably flows around the circumference of the nozzle 114 at a substantially constant flow velocity. In this regard, the wall 126 preferably slopes toward the longitudinal axis 116 forward to aft and is disposed nonconcentric thereto. As a result, the oil cooler plenum 120 includes a plurality of variously sized radial cross-sectional areas at different axial locations along the longitudinal axis 116 and a plurality of variously sized axial cross-sectional areas at different angular locations relative to the longitudinal axis 116.

The cross-sectional areas, which as previously mentioned preferably gradually decrease in size when the distance from the fluid inlet 134 increases, may be disposed axisymmetrically about the longitudinal axis 116. In some exemplary embodiments, such as, for example, in those shown in FIGS. 3 and 4, a first axial cross-sectional area 146 is located at a first angular location that communicates with the fluid inlet 134. The first axial cross-sectional area 146 is greater than a second and a third axial cross-sectional area 148, 150. The second and third axial cross-sectional area 148, 150 are located away from the fluid inlet 134 and disposed equidistant from and opposite one another relative to the first axial cross-sectional area 146.

Figure 5:
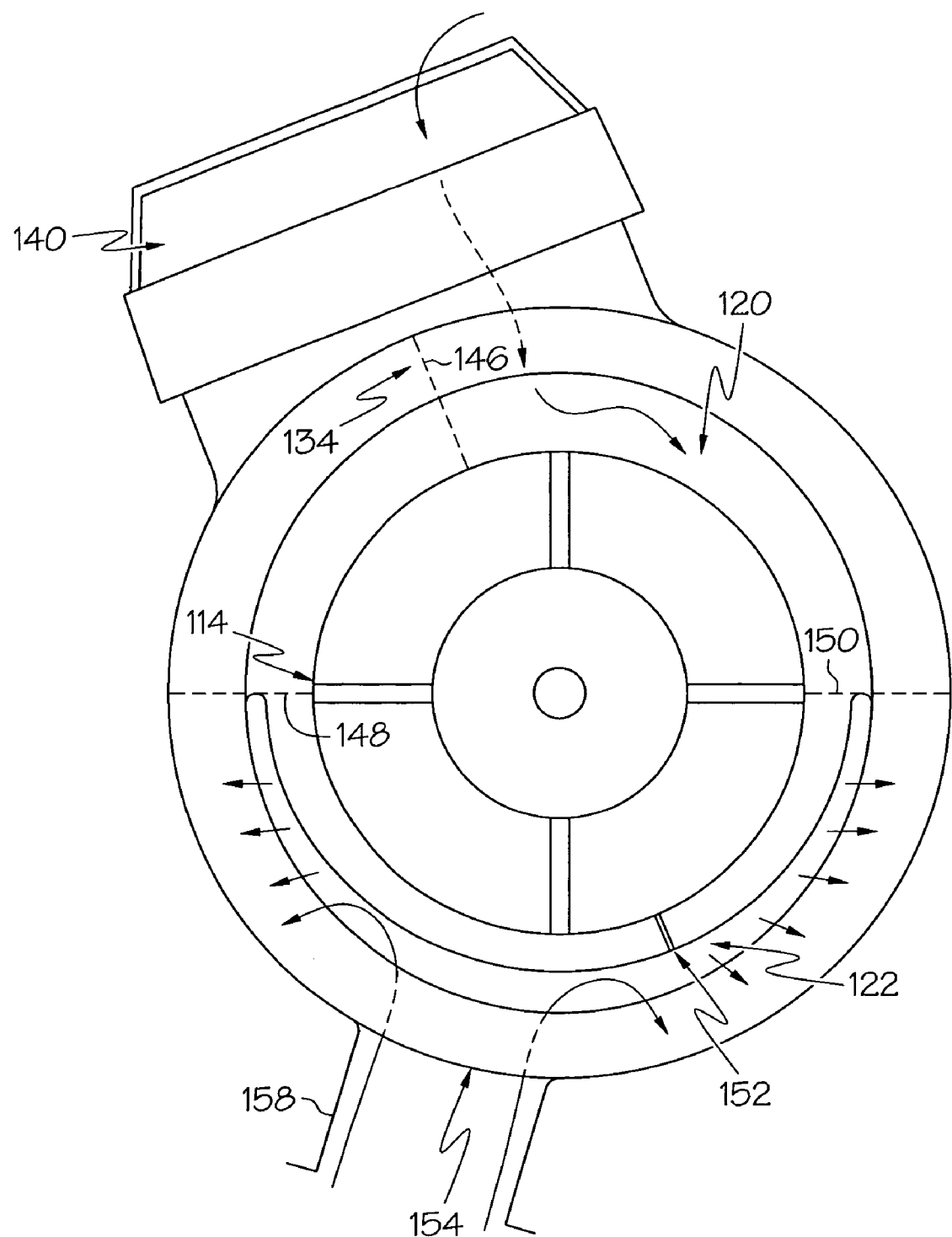
FIG. 5 is a cross section view of still another exemplary eductor oil cooler and surge flow plenum assembly that may be implemented into the tailcone of FIG. 1.

Alternatively, the cross-sectional areas may not be disposed axisymmetrically about the longitudinal axis 116. For example, as shown in FIG. 5, the second and third axial cross-sectional areas 148 and 150 are not equidistant from the first axial cross-sectional area 146. In this embodiment, a baffle 152 is disposed in the oil cooler plenum 120 at a point furthest away from the fluid inlet 134 to decrease swirl that may be present in the gas as it exits the plenum 120. It will be appreciated that the baffle 152 may have any one of numerous suitable configurations and may be, for example, a flange extending axially through the plenum 120.

Returning back to FIG. 2, the surge flow plenum 122 is partially defined by the walls 126, 132 and includes a fluid inlet 154 and a fluid outlet 156. The fluid inlet 154 communicates with a surge bleed entry duct 158 that is coupled to or integrally formed as part of the outer wall 132. The fluid outlet 156 is preferably axially aligned with and coterminous with the oil cooler plenum fluid outlet 136.

Figure 3:
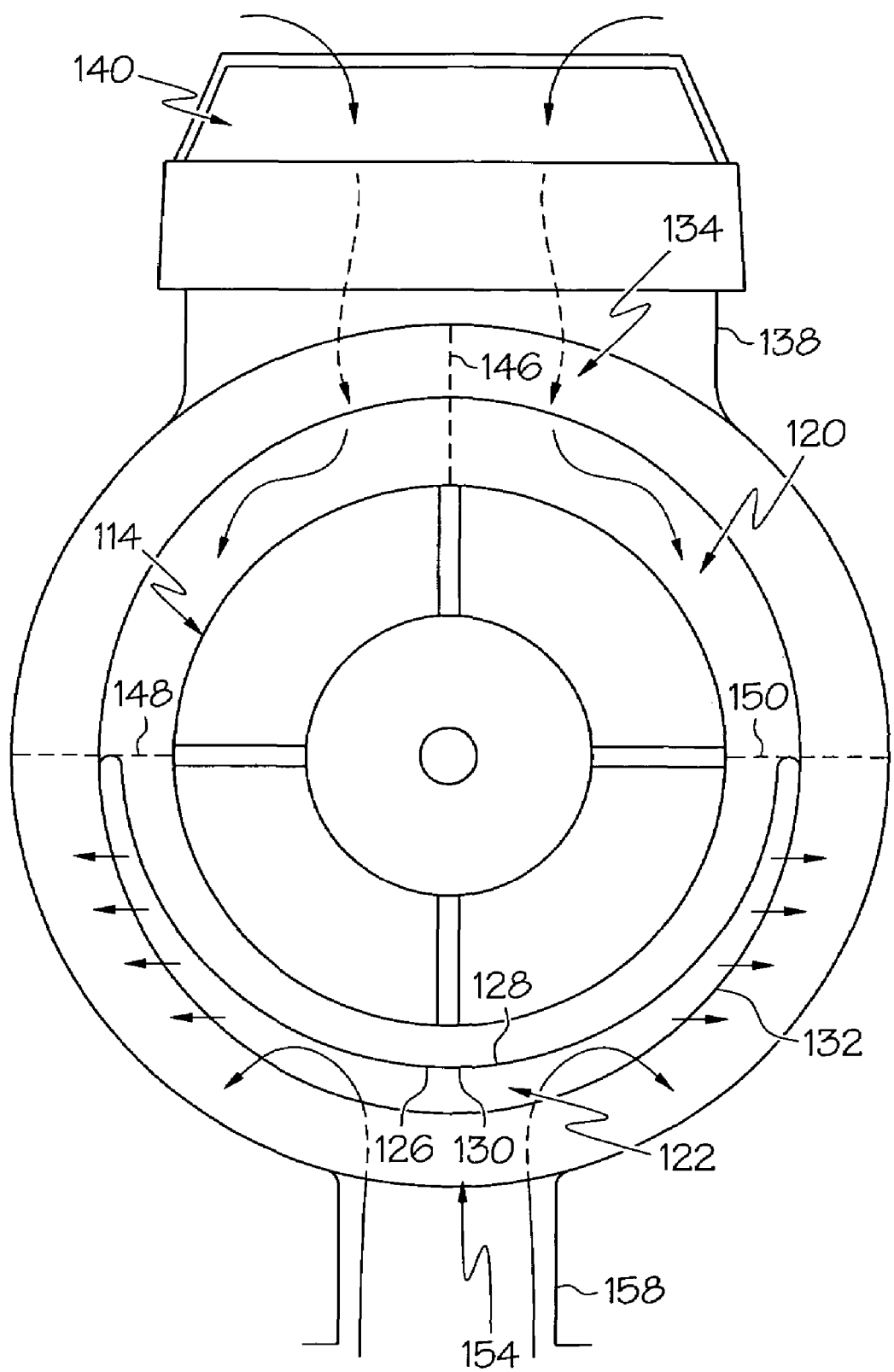
FIG. 3 is a cross section view of the exemplary exemplary eductor oil cooler and surge flow plenum assembly taken along line 3-3 depicted in FIG. 2.
Figure 4:
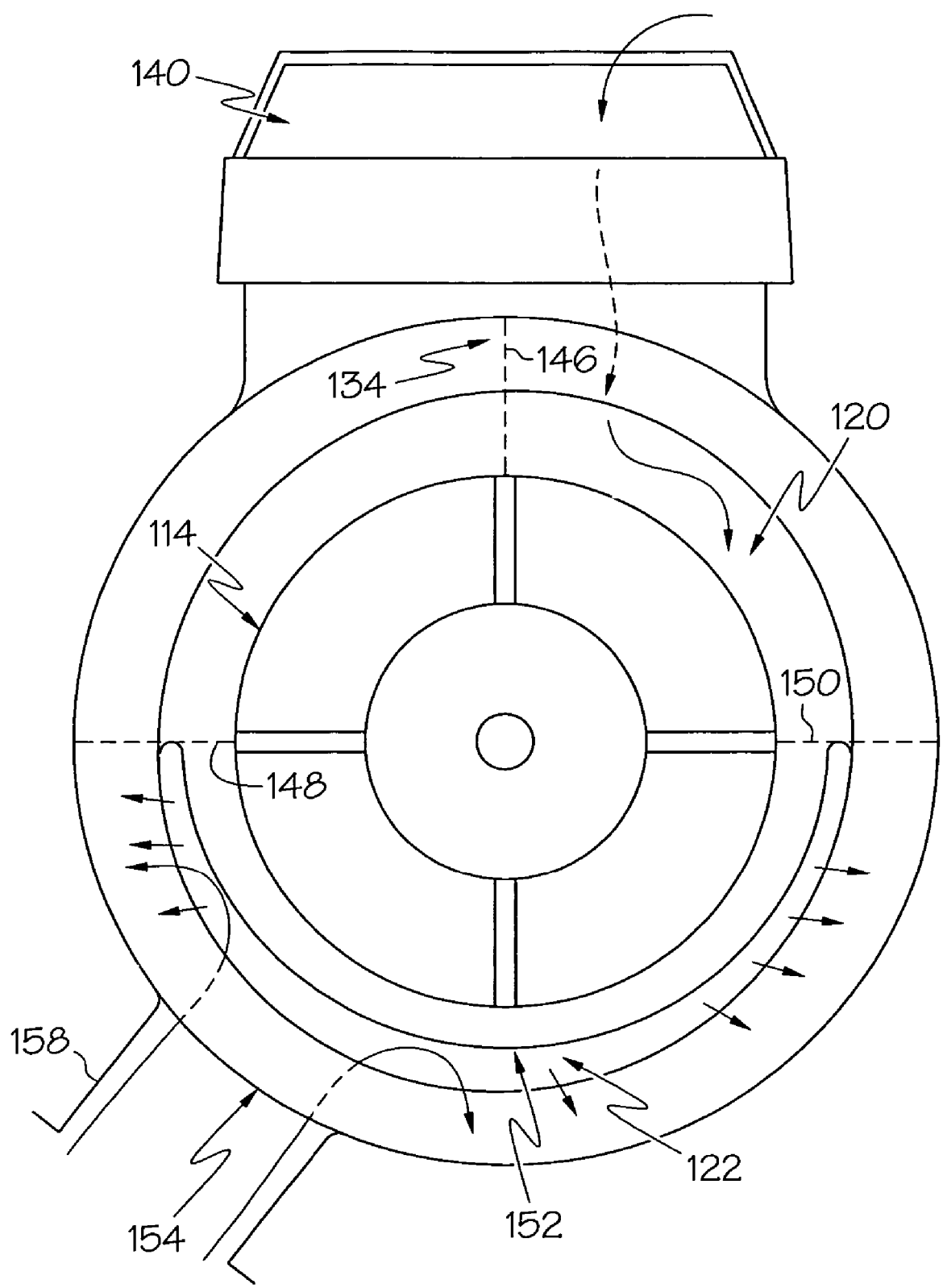
FIG. 4 is a cross section view of another exemplary eductor oil cooler and surge flow plenum assembly that may be implemented into the tailcone of FIG. 1.

Similar to the oil cooler plenum 120, the surge flow plenum 122 preferably includes a plurality of variously sized axial cross-sectionals at different angular locations relative to the longitudinal axis 116, shown in FIG. 3. Most preferably, the areas of the axial cross sections gradually reduce as the distance away from the surge flow fluid inlet 154 increases. Although the surge flow fluid inlet 154 is shown in FIG. 2 as being formed directly opposite the oil cooler fluid inlet 134, it will be appreciated that the surge flow fluid inlet 154 may alternatively be disposed along any other angular location relative to the longitudinal axis 116. For example, in one alternative embodiment, the oil cooler plenum 120 and surge flow plenum 122 remain disposed across from each other, while the surge flow fluid inlet 154 is offset to one side, as shown in FIG. 4. In still another alternative embodiment, as shown in FIG. 5, the plena 120, 122 are disposed across from each other, while the oil cooler fluid inlet 134 and the surge flow inlet 154 are offset relative to one another. For example, each of the inlets 134, 154 may be offset to one side, as depicted in FIG. 5. In such an embodiment, and as briefly mentioned above, the baffle 152 is preferably included and disposed in the oil cooler plenum 120 at a point furthest away from the oil cooler fluid inlet 134 which decreases swirl that may be present in the gas as it exits the plenum 120

It will be appreciated that the oil cooler plenum 120 and surge flow plenum 122 may have any other suitable configuration such that the plena 120, 122 are disposed at the same axial location along the longitudinal axis 116 and exhaust gas flows around the circumference of the nozzle 114 at a substantially constant flow velocity. For example, the oil cooler plenum 120 may surround a first circumferential section of the nozzle 114, while the surge flow plenum 122 surrounds a second circumferential section of the nozzle 114 without overlapping the oil cooler plenum 120. In other embodiments, the oil cooler plenum 120 may surround the first circumferential section of the nozzle 114 and the surge flow plenum 122 may surround the second circumferential section and a portion of the first circumferential section.

In any event, during operation, the APU 102 exhausts high velocity exhaust gas out of the nozzle 114. When gas is needed to cool the oil cooler 140, the gas enters the oil cooler fluid inlet 134, travels through the oil cooler duct 138, and flows through the oil cooler 140 into the oil cooler plenum 120. When the gas exits the oil cooler fluid outlet 136, it is pulled through the exhaust duct 118 by the high velocity APU exhaust gas. The pull of the APU exhaust gas causes additional gas to be pumped into the oil cooler plenum 120. Occasionally, surge flow gas may be dumped into the surge bleed entry duct 158 and into the surge flow plenum 122. The surge flow gas, which is already traveling at a high velocity, flows directly into the exhaust duct 118 and out the exhaust opening 110.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An eductor assembly comprising:
    a primary nozzle configured to accelerate and discharge turbine exhaust gas therefrom, the primary nozzle disposed about a longitudinal axis;
    a cooler plenum surrounding a circumference of the primary nozzle and including at least a fluid inlet and a fluid outlet, the cooler plenum disposed at an axial location and extending along the longitudinal axis, the cooler plenum fluid inlet disposed radially outwardly of a first angular location on the circumference; and
    a surge plenum surrounding only a first portion of the circumference of the primary nozzle and the cooler plenum and extending along the longitudinal axis at the axial location of the cooler plenum, the surge plenum including at least a fluid inlet and a fluid outlet, the surge plenum fluid inlet disposed radially outwardly of a second angular location on the circumference that is different from the first angular location, the surge plenum fluid outlet axially aligned and coterminous with the cooler plenum fluid outlet, wherein: the cooler plenum is configured to have a plurality of cooler plenum radial heights each located at angular locations around the circumference of the nozzle, the cooler plenum radial heights decreasing in size as a distance from the cooler plenum fluid inlet increases, and
    the surge plenum is configured to have a plurality of surge plenum radial heights each located at angular locations around the first portion of the circumference of the nozzle, the surge plenum radial heights decreasing in size as a distance from the surge plenum fluid inlet increases.

2. The assembly of claim 1, further comprising a wall disposed between the cooler plenum and the surge flow plenum.

3. The assembly of claim 1, further comprising a baffle disposed within the oil cooler plenum.

4. The assembly of claim 1, further comprising an oil cooler in communication with the cooler plenum fluid inlet.

5. The assembly of claim 4, further comprising a surge bleed entry duct in communication with the surge plenum fluid inlet.

6. The assembly of claim 5, wherein the cooler plenum fluid inlet is disposed substantially opposite the primary nozzle from the surge plenum fluid inlet.

7. The assembly of claim 1, wherein the cooler plenum is configured to allow gas to flow around a circumference of the primary nozzle at a substantially constant flow velocity.

8. The assembly of claim 1, wherein;
    a first cooler plenum radial height is located at the first angular location, a second cooler plenum radial height, and a third cooler plenum radial height are substantially equal to each other and are disposed equidistant from the first cooler plenum cross sectional area.

9. The assembly of claim 1, wherein;
    a first cooler plenum radial height is located at the first angular location, a second cooler plenum radial height and a third cooler plenum radial height are substantially equal to each other and the second cooler plenum radial height is disposed a circumferential distance away from the first angular location that is greater than a circumferential distance between the third cooler plenum radial height and the first angular location.

10. The assembly of claim 1, wherein the fluid inlet of the cooler plenum and the fluid inlet of the surge plenum are axially aligned with each other.

* * * * *